(12) United States Patent
Vermoesen et al.

(10) Patent No.: US 6,719,477 B2
(45) Date of Patent: Apr. 13, 2004

(54) SPACER FOR VACUUM BRAKE BOOSTER

(75) Inventors: Michel J. Vermoesen, Miamisburg, OH (US); Derek T. Dreischarf, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/003,018

(22) Filed: Nov. 2, 2001

(65) Prior Publication Data

US 2003/0086760 A1 May 8, 2003

(51) Int. Cl.⁷ .................................................. F16B 9/00
(52) U.S. Cl. ........................ 403/199; 403/220; 403/222; 403/243; 403/260; 92/78; 92/161
(58) Field of Search ........................ 91/376 R; 92/161, 92/161.5, 78; 60/547.1; 277/594, 596, 600; 403/6, 7, 9, 21, 167, 168, 192, 199, 243, 247, 260, 335, 408.1, 220, 226, 227

(56) References Cited

U.S. PATENT DOCUMENTS

| | | | |
|---|---|---|---|
| 4,269,533 A | * | 5/1981 | Mashiki et al. |
| 4,567,728 A | * | 2/1986 | Ohmi et al. ................ 60/547.1 |
| 4,600,511 A | * | 7/1986 | Sherman et al. ............ 210/316 |
| 5,615,898 A | * | 4/1997 | Clark et al. ............. 277/596 X |
| 5,851,109 A | * | 12/1998 | Reynolds |
| 5,878,650 A | | 3/1999 | Osterday et al. |
| 6,000,087 A | * | 12/1999 | Petner |
| 6,164,183 A | | 12/2000 | Fulks et al. |
| 6,168,346 B1 | * | 1/2001 | Ernsberger |
| 6,209,442 B1 | | 4/2001 | Haerr et al. |
| 6,301,883 B1 | | 10/2001 | Fulks et al. |
| 6,324,845 B1 | | 12/2001 | Fulks et al. |
| 6,364,429 B1 | | 4/2002 | Roden et al. |
| 6,374,721 B1 | | 4/2002 | Zehnder, II et al. |
| 6,389,951 B1 | | 5/2002 | Castel et al. |
| 6,453,670 B1 | | 9/2002 | Kottmyer |
| 6,453,794 B2 | | 9/2002 | Castel et al. |
| 6,481,330 B1 | * | 11/2002 | Jakobi et al. ............. 91/376 R |
| 6,516,705 B2 | | 2/2003 | Vermoesen et al. |
| 6,539,837 B2 | | 4/2003 | Fanelli et al. |
| 6,547,048 B2 | | 4/2003 | Haerr et al. |
| 6,612,108 B2 | | 9/2003 | Haerr et al. |
| 6,623,048 B2 | | 9/2003 | Castel et al. |

OTHER PUBLICATIONS

Serope Kalpakjian, Manufacturing Engineering and Technology Third Edition, 1995, Addison–Wesley Publishing Company, pp. 211–212.*

* cited by examiner

Primary Examiner—Lynne H. Browne
Assistant Examiner—Victor MacArthur
(74) Attorney, Agent, or Firm—Michael D. Smith

(57) ABSTRACT

A lightweight spacer for mounting a vacuum brake booster on a panel provides integral flexible sealing lips to seal the interfaces between the panel, spacer, and booster. Integral retaining tabs are provided for holding the spacer in place on the booster during shipping and installation of the booster. Tubular inserts within the spacer are retained and cushioned against rattling by a thin web of material extending over the end of the insert.

20 Claims, 1 Drawing Sheet

SPACER FOR VACUUM BRAKE BOOSTER

TECHNICAL FIELD OF THE INVENTION

This invention relates to brake systems for vehicles, and more particularly to brake boosters for such systems.

BACKGROUND OF THE INVENTION

A typical brake system for a vehicle includes a device known as a brake booster, which is used to amplify the force applied directly to a brake pedal by an operator of the vehicle. The booster is typically mounted outside of the passenger compartment in the engine compartment on a firewall, dashboard, or panel forming the front wall of the passenger compartment. A push rod extends from the booster through an opening in the front panel for connection with a brake pedal assembly located within the passenger compartment. A flexible boot, or a sliding seal is provided around the push rod for environmentally sealing the hole in the front panel while allowing movement of the push rod by the brake pedal.

The booster is mounted in this fashion because it must draw in and expel a volume of air through a breather port surrounding the push rod, as the brake pedal is depressed and released. This drawing in and expulsion of air through the breather port unavoidably generates noise that would be objectionable to passengers in the vehicle, if the booster were mounted within the passenger compartment.

The shape of the booster generally requires that some sort of spacer be provided between the rear surface of the brake booster and the front panel of the passenger compartment. The interfaces between the spacer and both the front panel of the passenger compartment, and the rear surface of the booster must be sealed against leakage of air, and entry into the passenger compartment of noise, dirt, water, or other solid and liquid contaminants that are present in the engine compartment.

In order to support the weight of the booster when mounted in a cantilevered fashion spaced out from the panel, and to ensure that the interfaces between the spacer, panel and booster are sealed, boosters are typically secured to the panel by several threaded studs which extend trough the spacer and out the back of the spacer far enough to allow attachment of the booster and spacer to the panel. The spacer must therefore be strong enough to withstand the clamping force of tightening the bolts, and any other structural loads imposed during operation of the booster or vehicle. It is desirable that the spacer be light in weight, and be manufacturable at low cost, to improve fuel economy and reduce the price of the vehicle.

To improve sealing of the interfaces between the spacer, panel and booster, prior spacer arrangements typically required the use of a gasket on either end of the spacer. An adhesive foam gasket is often used. The need for using such gaskets adds unwanted cost and complexity to the spacer. The gaskets are also subject to damage and loss during shipment of the booster.

To facilitate installation, and to protect the alignment of the threaded studs, it is desirable that the spacer be installed on the threaded studs of the brake booster prior to shipping the booster. To ensure that the spacer stays in place during shipping and attachment of the booster to the panel of the passenger compartment, it is desirable that the spacer be retained in some manner on the threaded studs after the spacer is installed on the booster. It is desirable that retention of the spacer on the studs not require any additional parts of operations, such as shipping caps, or application and removal of tape.

What is needed, therefore, is an improved apparatus and method for mounting a brake booster using a spacer in a manner that provides a solution to one or more of the problems described above.

SUMMARY OF THE INVENTION

Our invention provides such an improved method and apparatus for mounting a brake booster on a panel through the use of a spacer having one or more integral flexible sealing lips for sealing the interfaces between the spacer, and either or both of the booster and the panel.

In one form of our invention, the spacer includes an integral flexible sealing lip adapted for sealing against either the booster or the panel of the passenger compartment. The spacer may also include a second integral flexible sealing lip adapted for sealing against either the booster or the panel of the passenger compartment, such that both the interface between the booster and the spacer and the interface between the spacer and the panel are sealed by the integral flexible sealing lips, thereby totally eliminating the need for additional gaskets required by prior spacer designs.

In another form of our invention, the spacer includes holes for passage therethrough of the threaded studs of the booster. The spacer may also include integral retaining tabs adapted to engage the threads on the threaded studs for holding the spacer in place during shipment of the booster and spacer, and during attachment of the booster and spacer to the front panel of the passenger compartment of the vehicle.

The spacer may be constructed of a lightweight material, such as a thermoplastic. The spacer may also include metal tubular inserts around the holes for resisting compressive loads on the spacer when installed between the booster and the panel, and for setting a desired deflection of the integral flexible sealing lips of the spacer The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
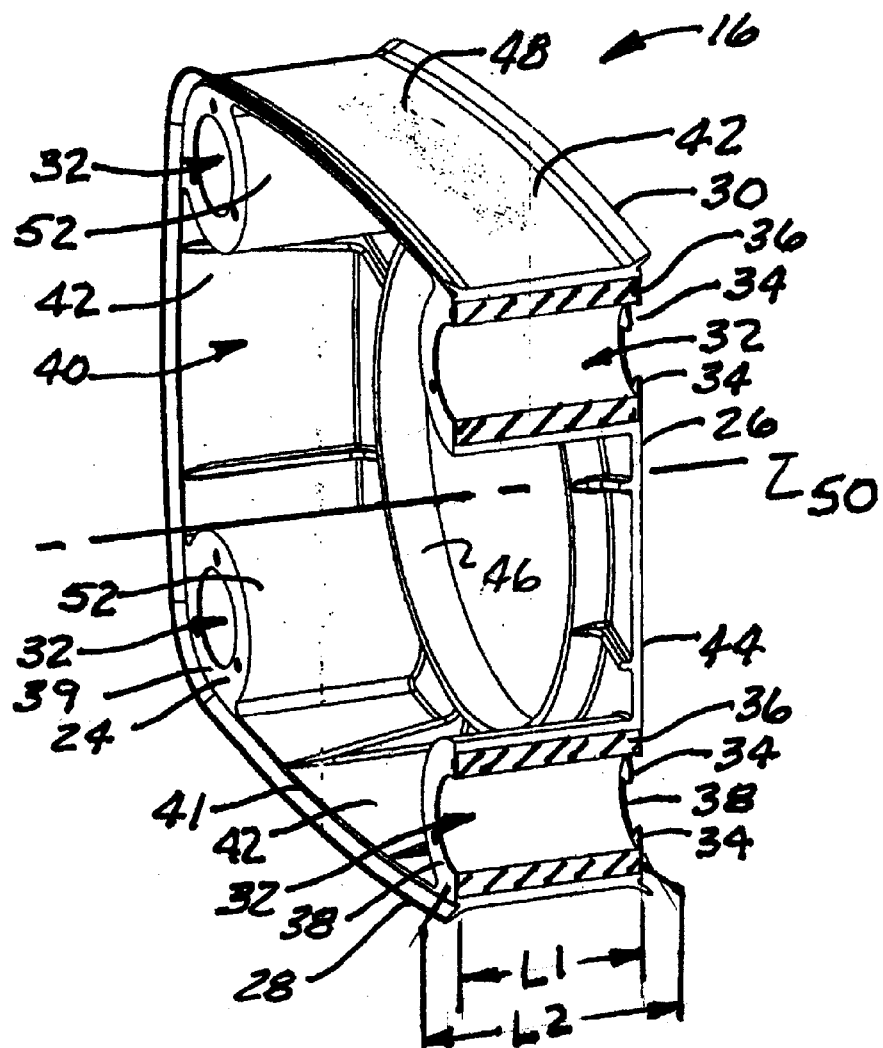
FIG. 1 is partial cross-section, perspective view of a spacer for mounting a brake booster on a panel, in accordance with our invention.
Figure 2:
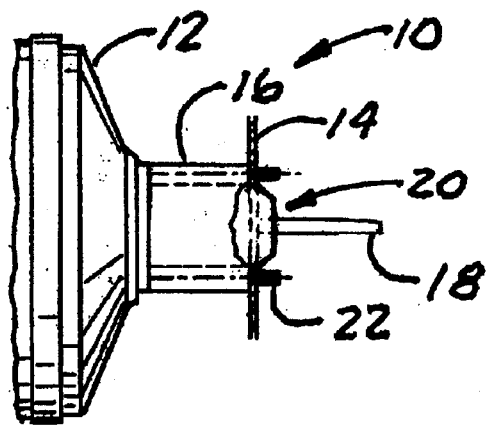
FIG. 2 is a side view of a booster mounted on a panel using a spacer, as depicted in FIG. 1.

FIGS. 1 and 2 depict an apparatus 10 for mounting a brake booster 12 on a panel 14, using a spacer 16. The booster 12 includes a push rod 18 extending from a rear surface of the booster 12 through a hole 20 in the panel 14. The booster 12 also includes a plurality of threaded studs 22 extending from the rear surface of the booster 12, surrounding the push rod 18 and adapted for attaching the booster 12 to the panel 14. The spacer 16 has a first end 24 adapted to receive the booster 12, and a second end 26 adapted to abut the panel 14. In the spacer 16 shown in FIG. 1, the first end 24 is defined by four pads 39, as described in greater detail below.

The spacer 16 includes integral flexible sealing lips 28, 30 extending the first and second ends 24, 26 of the spacer 16, and adapted for sealing against the booster 12 or panel 14 respectively, depending upon which direction the spacer 12 is oriented. Inclusion of these integral flexible sealing lips 28, 30 allows the gaskets required in prior art spacers and booster mounting methods to be eliminated, thereby eliminating cost and complexity.

In the embodiment of the apparatus 10 depicted in FIGS. 1 and 2, the booster 12 includes four threaded studs 22, for attaching the booster 12 to the panel 14. The spacer includes four holes 32 for passage therethrough of the threaded studs 22 of the booster 12.

The spacer 16 further includes one or more retaining tabs 34 extending into the holes 32 and adapted for engaging the threaded studs 22 to hold the spacer 16 in place on the threaded studs 22, with respect to the booster 12. These retaining tabs 34 facilitate storage, shipping, and installation of the booster 12 on the panel 24, by protecting the threaded studs 22, facilitating their alignment with mounting holes in the panel 14, and preventing the spacer 16 from becoming separated from the booster 12 before installation onto the panel 14.

Although the spacer 16 could be fabricated from any material capable of forming the integral flexible sealing lips 28, 30, it is contemplated that a thermoplastic material, such as a thermoplastic material sold under the trade name HYTREL 8238, by E. I. du Pont de Nemours and Company, may be especially well suited for this purpose.

The spacer 16 further includes tubular metal inserts 36 around the holes 32, extending generally from the first to the second ends 24, 26 of the spacer 16. The metallic inserts 36 may have a length L1 predetermined to limit the compressive load on the spacer 16 when the booster 12 is attached to the panel 14. The length L1 of the inserts 36 may also be predetermined to limit deflection of the integral flexible sealing lips 28, 30.

In the spacer 16 depicted in FIG. 1, the length L1 of the inserts 36 is slightly less than the axial distance L2 between the first and second ends 24, 26, and a thin web 38 of material extends over the ends of the inserts 36 about the holes at the first and second ends 24, 26 of the spacer. These thin webs 38 hold the inserts 36 captive within the spacer 16. When the booster 12 is installed on the panel 14, the thin webs 38 deflect or compress slightly to compensate for any unevenness in the panel 14 or the rear wall of the brake booster 12, thereby preventing the inserts 36 from rattling within the spacer 16. The retaining tabs 34 may be formed as part of one or more of the thin webs 38, and extend into the holes 32 in the inserts 36 to engage the threaded studs 22 of the booster 12, as described above, to hold the spacer 16 in place on the threaded studs 22 with respect to the booster 12.

As shown in FIG. 1, the spacer 16 has an axial length L2 extending generally perpendicularly to the first and second ends 24, 26. Much of the first end 24, except for the thin webs 38 around the holes 32 for passage of the threaded studs 22 and a peripheral rim 41 of material connecting the thin webs 38, is contoured to form a recessed cavity 40 extending into the spacer 16 along the axial length L2 of the spacer 16. The contoured portion of the first end 24 is disposed in close proximity to external surfaces of the spacer 16, to form sidewalls 42 and an end wall or flange 44 between the contoured portion of the first end 24 and the external surfaces of the spacer 16. The recessed cavity 40 allows the spacer 16 to be lighter in weight and require less material than a spacer without the recessed cavity 40.

Although the spacer 16 of FIG. 1 is configured to have only a single recessed cavity 40 extending inward from the first end 24, we contemplate that other forms of our invention may have either or both of the first and second ends 24, 26 contoured in a similar manner to form a single or multiple recessed cavities extending inward from either or both ends 28, 30 of the spacer 16. The thicknesses of the walls 42 and flange 44 may be varied to suit each application. Where a thermoplastic is utilized for forming the spacer, we anticipate that a thickness for both the walls 42 and flange 44 of about one millimeter may be preferable in many applications.

With the first end 24 of the spacer 16 contoured as described above to form a single recessed cavity 40 the spacer 16 has an inner tubular shell 46 and an outer tubular shell 48, extending along an axis 50, and joined at the second axial end 26 by the flange 44. The flange 44 is adapted to abut the panel 14. The integral flexible sealing lips 28 and 30 extend respectively from the outer tubular shell 48 at the first and second ends 24, 26 of the spacer. The ends 24, 26 of the spacer 16 and lips 28, 30 are adapted for sealing against the booster 12 and the panel 14.

The flange 44 includes the plurality of holes 32 for passage therethrough of the threaded studs 22 of the booster 12, and the outer tubular shell 48 of the spacer 16 further includes additional tubular enclosures 52 around the holes 32. These additional tubular enclosures extend from the flange 44 to the webs 38 at the first axial end 24 of the outer tubular shell 48. The tubular metallic inserts 36 are retained within these additional tubular enclosures 52.

Our invention also provides a method for installing a brake booster 12 on a panel 14, by clamping a spacer 16 having one or more integral flexible sealing lips 28, 30 extending therefrom between the booster 12 and the panel 14.

While the embodiments of my invention disclosed herein are presently considered to be preferred, various changes and modifications can be made without departing from the spirit and scope of the invention. The term "panel," as used herein, is intended to include structures known in the automotive or vehicle manufacturing industry as "mod plates," "firewalls," "dashboards," and "mud guards."

The scope of the invention is indicated in the appended claims. We intend that all changes or modifications within the meaning and range of equivalents are embraced by the claims.

We claim:

1. An apparatus for mounting a brake booster on a panel, the apparatus comprising:

the brake booster; and a spacer including a tubular shell defining an axis extending between axial ends of the spacer, and an integral flexible sealing lip;

the integral flexible sealing lip extending from one axial end of the spacer, and having a distal end of the flexible sealing lip disposed adjacent the one axial end of the spacer for sealing against the booster or the panel, when the one axial end of the spacer is abutting either the booster or the panel with the flexible lip not disposed between the one axial end of the spacer and the booster or the panel respectively.

2. The apparatus of claim 1 wherein:

the booster includes a push rod extending from a rear surface of the booster for insertion through a hole in the panel, and a plurality of threaded studs extending from the rear surface of the booster surrounding the push rod for attaching the booster to the panel; and one of the axial ends of the spacer is adapted to receive the booster, and the other axial end is adapted to abut the panel.

3. The apparatus of claim 1 wherein the spacer further includes an integral flexible sealing lip extending from the other axial end thereof adapted for sealing against the other of the booster or panel respectively.

4. The apparatus of claim 1 wherein the spacer further includes:
   a plurality of holes for passage therethrough of the threaded studs of the booster, and
   one or more retaining tabs extending into one or more of the holes and adapted for engaging one or more of the threaded studs to hold the spacer in place on the threaded studs with respect to the booster.

5. The apparatus of claim 1 wherein the tubular shell and integral flexible sealing lip of are formed of a thermoplastic material, and the spacer further comprises:
   a plurality of holes in the tubular shell for passage therethrough of the threaded studs of the booster, and
   one or more tubular metal inserts around the holes extending between the axial ends of the spacer.

6. The apparatus of claim 5 wherein the metallic inserts have a length predetermined to limit the compressive load on the tubular shell of the spacer when the booster is attached to the panel.

7. The apparatus of claim 5 wherein the metallic inserts have a length predetermined to limit deflection of the integral flexible sealing lip.

8. The apparatus of claim 5 wherein the spacer includes an integral flexible sealing lip extending from both the axial ends of the spacer and the metallic inserts have a length predetermined to limit deflection of the integral flexible sealing lips.

9. The apparatus of claim 5 wherein the spacer further comprises a web disposed about the holes at the axial ends of the spacer and extending over the tubular metal inserts for retaining the tubular metal inserts in the tubular shell.

10. The apparatus of claim 9 wherein the web further comprises one or more retaining tabs extending into one or more of the holes and adapted for engaging one or more of the threaded studs to hold the spacer in place on the threaded studs with respect to the booster.

11. The apparatus of claim 1 wherein the spacer has an axial length extending generally perpendicularly to the axial ends, and one of the axial ends is contoured to form recesses extending into the spacer along the axial length of the spacer.

12. The apparatus of claim 11 wherein portions of the contoured end are disposed in close proximity to external surfaces of the spacer to form walls therebetween.

13. A spacer for mounting a brake booster on a panel, the spacer comprising:
   a tubular shell defining an axis extending between axial ends of the spacer; and an integral flexible sealing lip, extending from one axial end of the spacer, and having a distal end of the flexible sealing lip disposed adjacent the one axial end of the spacer for sealing against the booster or the panel, when the one axial end of the spacer is abutting either the booster or the panel with the flexible lip not disposed between the one axial end of the spacer and the booster or the panel respectively.

14. The spacer of claim 13 further comprising:
   a tubular shell having an inner tubular shell and an outer tubular shell radially spaced from one another extending along the axis and joined at one axial end of the spacer by a flange forming a surface adapted to receive one of the booster or the panel; and
   wherein the integral flexible sealing lip extends from the outer tubular shell of the spacer.

15. The spacer a claim 14 further including a second integral flexible sealing lip extending from the other axial end of the outer tubular shell, the second lip being adapted for sealing against the other of the booster or panel respectively.

16. The spacer of claim 15 wherein the booster has a push rod extending from a rear surface of the booster, and a plurality of threaded studs extending from the rear surface of the booster surrounding the push rod and adapted for attaching the booster to the panel, and wherein:
   the flange includes a plurality of holes for passage therethrough of the threaded studs of the booster, and
   the outer tubular shell of the spacer further includes tubular enclosures around the holes extending from the flange to the other axial end of the outer tubular shell.

17. The spacer of claim 16 further including tubular metallic inserts within the additional tubular enclosures.

18. The spacer of claim 17 wherein the axial ends of the spacer further include a thin web about the holes at each end of the tubular enclosures, the thin web extending over and retaining the metallic inserts in the tubular enclosures.

19. The spacer of claim 16 wherein the spacer further includes one or more retaining tabs extending into one or more of the holes and adapted for engaging one or more of the threaded studs to hold the spacer in place on the threaded studs with respect to the booster.

20. A method for installing a brake booster on a panel, the method comprising clamping a spacer, between the booster and the panel, wherein the spacer comprises:
   a tubular shell defining an axis extending between axial ends of the spacer; and
   an integral flexible sealing lip, extending from one axial end of the spacer, and having a distal end of the flexible sealing lip disposed adjacent the one axial end of the spacer for sealing against the booster or the panel, when the one axial end of the spacer is abutting either the booster or the panel with the flexible lip not disposed between the one axial end of the spacer and the booster or the panel respectively.

* * * * *